INVENTOR.
WALTER SPRICK

BY

Dewey J. Cunningham
ATTORNEY

March 13, 1956 W. SPRICK 2,738,499

APPARATUS FOR IDENTIFYING LINE TRACES

Filed June 22, 1953 9 Sheets-Sheet 2

INVENTOR.
WALTER SPRICK

BY

Dewey J. Cunningham
ATTORNEY

INVENTOR.

WALTER SPRICK

BY

Dewey J. Cunningham

ATTORNEY

APPARATUS FOR IDENTIFYING LINE TRACES

Filed June 22, 1953 9 Sheets-Sheet 4

INVENTOR.
WALTER SPRICK
BY
Dewey J. Cunningham
ATTORNEY

APPARATUS FOR IDENTIFYING LINE TRACES

Filed June 22, 1953 9 Sheets-Sheet 5

INVENTOR
WALTER SPRICK
BY
Dewey J. Cunningham
ATTORNEY

March 13, 1956 W. SPRICK 2,738,499

APPARATUS FOR IDENTIFYING LINE TRACES

Filed June 22, 1953 9 Sheets-Sheet 6

INVENTOR.
WALTER SPRICK

BY

Dewey J. Cunningham

ATTORNEY

March 13, 1956 W. SPRICK 2,738,499

APPARATUS FOR IDENTIFYING LINE TRACES

Filed June 22, 1953 9 Sheets-Sheet 7

INVENTOR.
WALTER SPRICK
BY
Dewey J. Cunningham
ATTORNEY

March 13, 1956 W. SPRICK 2,738,499

APPARATUS FOR IDENTIFYING LINE TRACES

Filed June 22, 1953 9 Sheets-Sheet 8

INVENTOR.
WALTER SPRICK
BY
Dewey J. Cunningham
ATTORNEY

INVENTOR.
WALTER SPRICK
BY
Dewey J. Cunningham
ATTORNEY

United States Patent Office 2,738,499

Patented Mar. 13, 1956

2,738,499

APPARATUS FOR IDENTIFYING LINE TRACES

Walter Sprick, Boeblingen, Germany, assignor to International Business Machines Corporation, New York, N. Y., a corporation of New York Application June 22, 1953, Serial No. 363,173

Claims priority, application Germany June 28, 1952

18 Claims. (Cl. 340—347)

The present invention relates to means for identifying line traces and more particularly to a device for identifying printed or handwritten symbols.

There are known devices for identifying printed symbols such as letters or numerals. These devices may be divided into three general groups. In the first group, identification occurs by means of auxiliary symbols in the form of dots or areas of different sizes and/or arranged in different positions. The second group identifies the individual symbols by their varying degree of boldness. Consequently, symbols of the same degree of boldness are given the same value. In the third group, the identification results by comparison of the symbols with a reference master. In this instance either the entire configuration or individual parts thereof are compared with the aid of patterns, templates, masks and the like or selected in a purely electrical manner by the adjustment of communication channels. The two first mentioned groups do not represent any actual identification, since in this case the actual symbols may be lacking. The last group, however, represent direct identification due to comparison with a given symbol.

The known devices are constructed in such a manner that the picture of the entire symbol is projected with the aid of a special optical system on a plate with templates punched thereon or a number of characteristic points are selected for each symbol. When the symbols or parts thereof coincide with the templates, photoelectric cells are affected and operate control devices for the production of talking sounds, motion of type bars or other interpretative devices.

The devices heretofore known permit only the identification of printed symbols or letters. When deviations from the templates or masks occur the devices fail. In this connection, it is also necessary that the symbols always appear in the same external form. A differentiation with regard to the size of the symbols causes the device to fail.

The instant invention avoids these drawbacks and relates to a device for the identification of a continuous series of lines, particularly symbols like letters and numerals. The symbols may not only be printed but also handwritten and may in addition be in the form of general lines such as curves or diagrams which are to be identified and evaluated. The word symbol is used herein to mean the generally accepted form or shape of some arbitrary or conventional device that is used in writing and in printing, and may be used interchangeably with the word character. According to the invention, provision is made of electrooptical devices which follow the scanned lines. By utilizing the bends, kinks, starting, ending, and turning points of the lines evaluation devices may be controlled.

As electrooptic means for this purpose, photoelectric cells and iconoscopes are useful. The interpretative devices may be either recording apparatus or calculating machines, telegraphs, radios, punching apparatus for punched card machines and the like. They may also be evaluation devices for plotted curves, such as barometer or indicator diagrams, or control curves for tool machinery, textile machinery and the like. The essential feature of the invention lies in the fact that the aforementioned characteristic bends, kinks, starting, ending, and turning points of the lines are detected. For this purpose, the formation of the derivative characterizes the course of the curve and is particularly suitable for use. In the following description the invention will be described in detail in connection with an example of its embodiment which relates to the evaluation of symbols. For the sake of simplicity, and by way of example only, let it be assumed that reproduction of the digits 0–9 is involved. In this connection, straight lines alternate with curved, bent and inflected lines. This varying course of lines is highly characteristic of handwritten symbols and despite differences in handwriting can be used for the purposes here involved. The same applies to letters and other lines such as diagrams and the like.

An object of the present invention is to provide an improved analyzing device for identifying line traces.

Another object of the invention is to provide an improved analyzing device for scanning a line trace and supplying a voltage output characteristic thereof.

Still another object of this invention is to furnish an improved analyzing device for scanning continuously moving printed or handwritten symbols and supplying an output signal which identifies the symbol scanned.

A further object is to provide an improved means for scanning printed or handwritten line traces and supplying an output signal characteristic of the outline thereof.

A still further object of the invention is to provide improved scanning means wherein a scanning beam is caused to follow the outline of one side of a line trace during one portion of the scanning operation and the other side of the line trace during another portion of said scanning operation.

Another object of the present invention is the provision of an improved analyzing device for scanning printed or handwritten indicia and supplying output voltages characteristic of one side of the indicia during one portion of the scanning operation and output voltages characteristic of the other side of the indicia during another portion of the scanning operation.

Another object of the invention is to furnish an improved analyzing device for scanning continuously moving printed or handwritten indicia, obtaining output signals characteristic of said indicia during different periods of the scanning operation, storing said output signals until the scanning operation is completed, and reading the stored signals to provide an output signal indicative of the indicia scanned.

Another object of this invention is the provision of improved means for initiating the scanning of continuously moving printed or handwritten symbols on record cards or the like.

Other objects of the invention will be pointed out in the following description and claims and illustrated in the accompanying drawings, which disclose, by way of examples, the principle of the invention and the best mode, which has been contemplated, of applying that principle.

Figure 4:
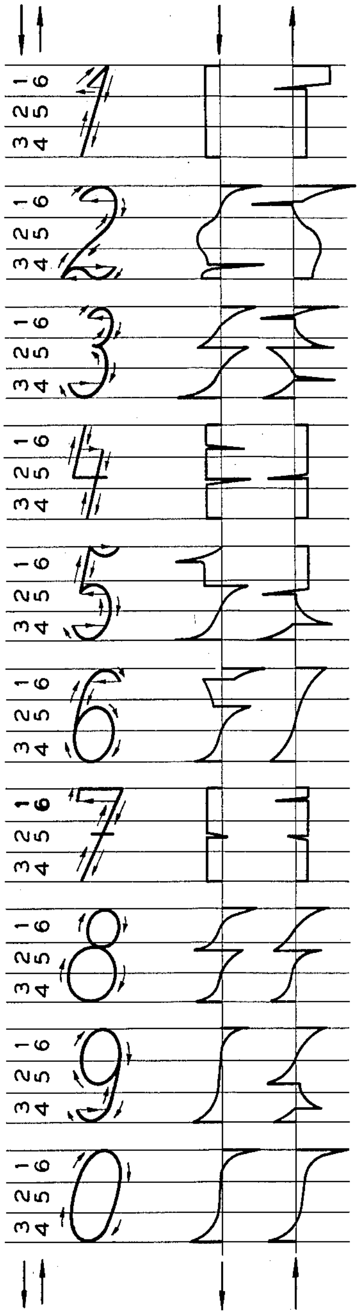
Figure 5A:
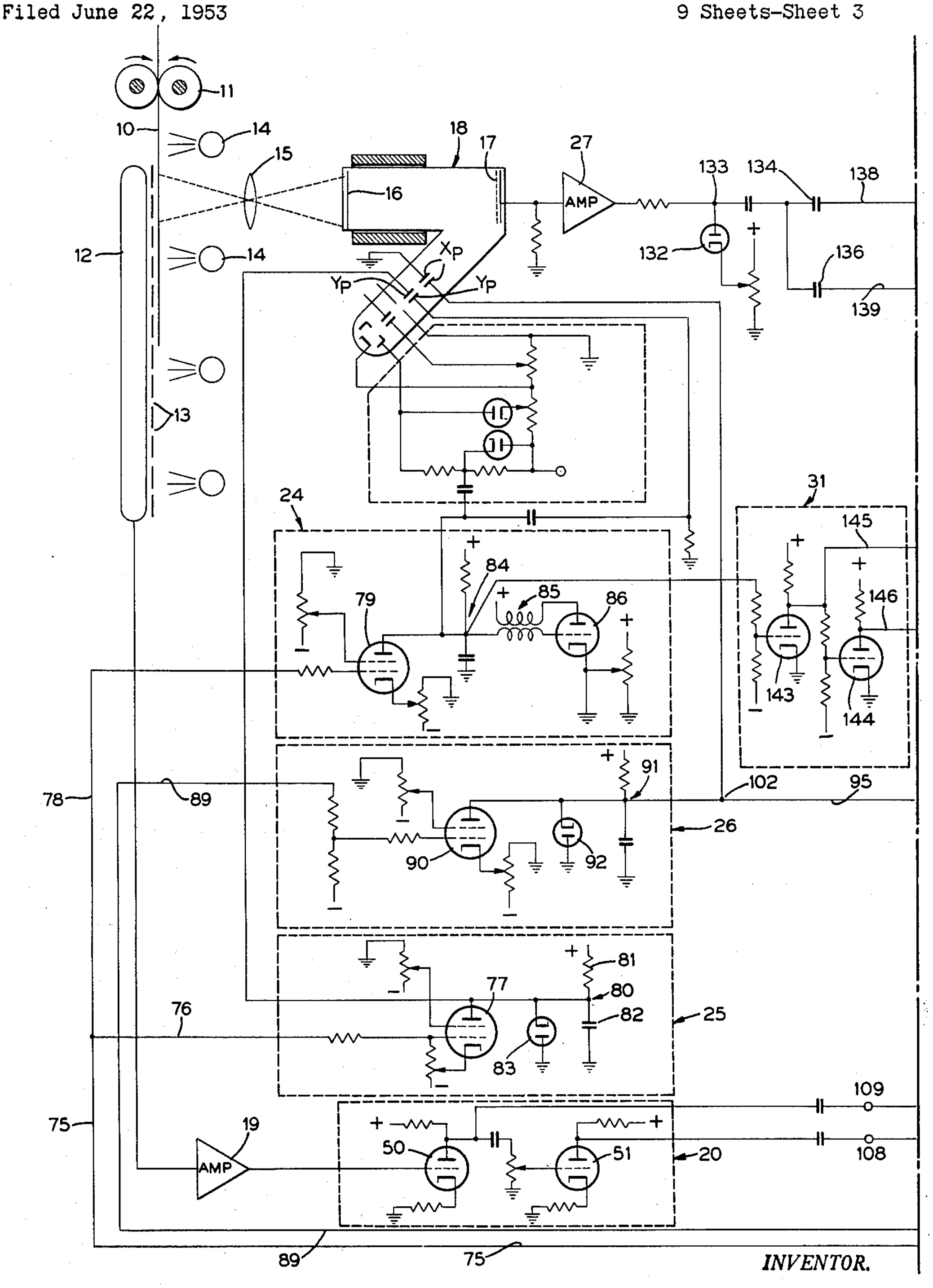
Figure 5B:
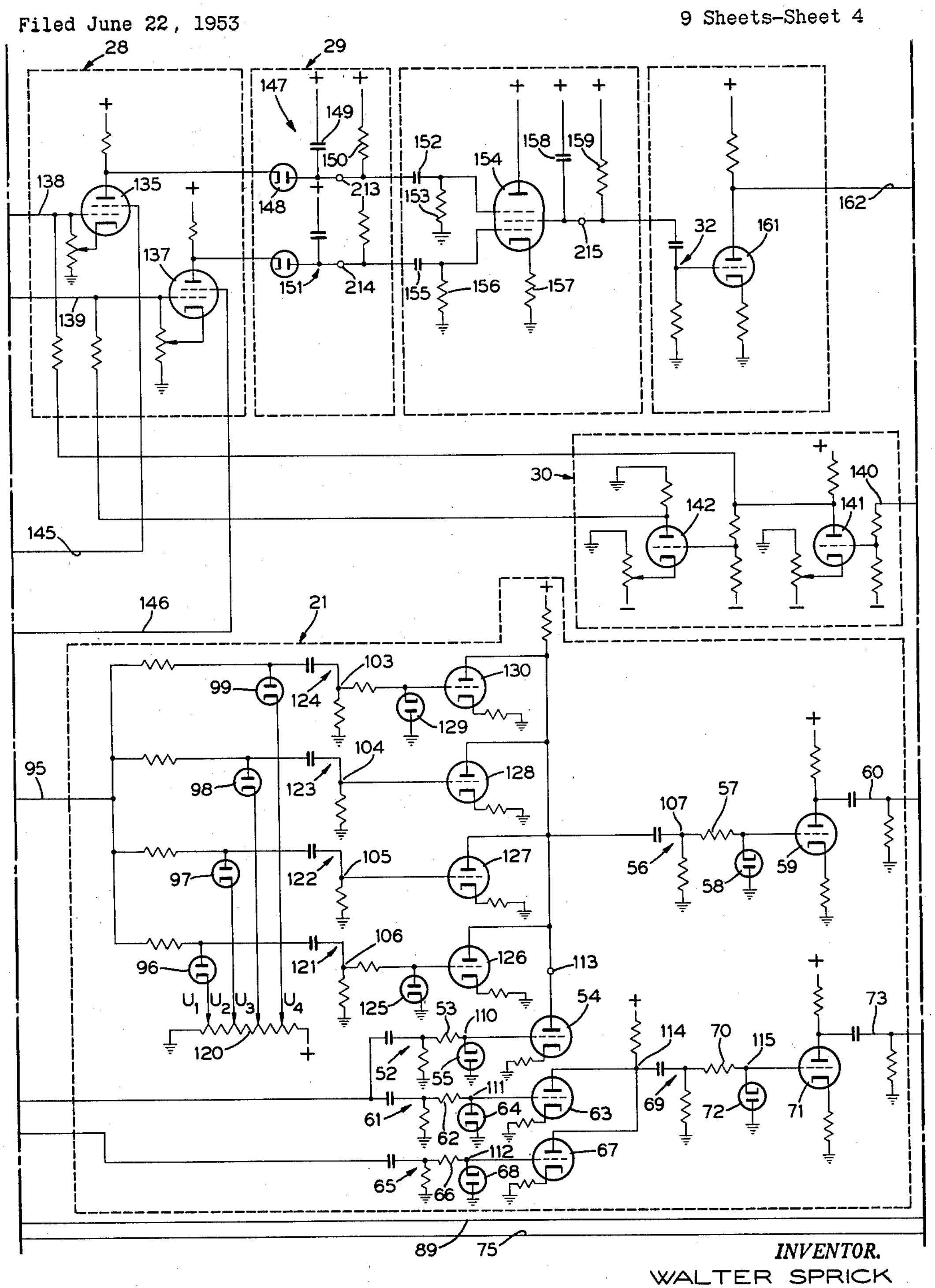
Figure 5C:
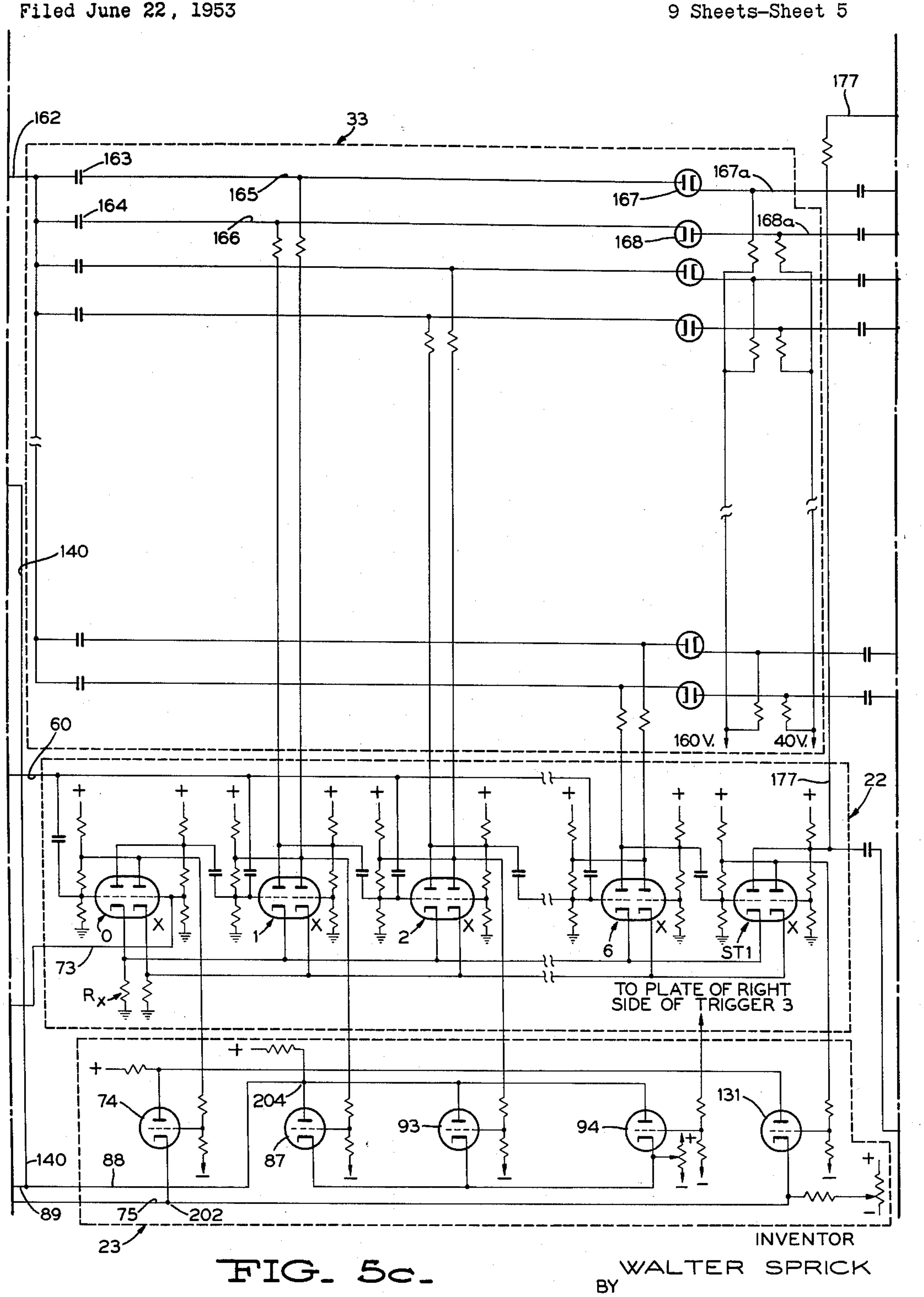
Figure 5D:
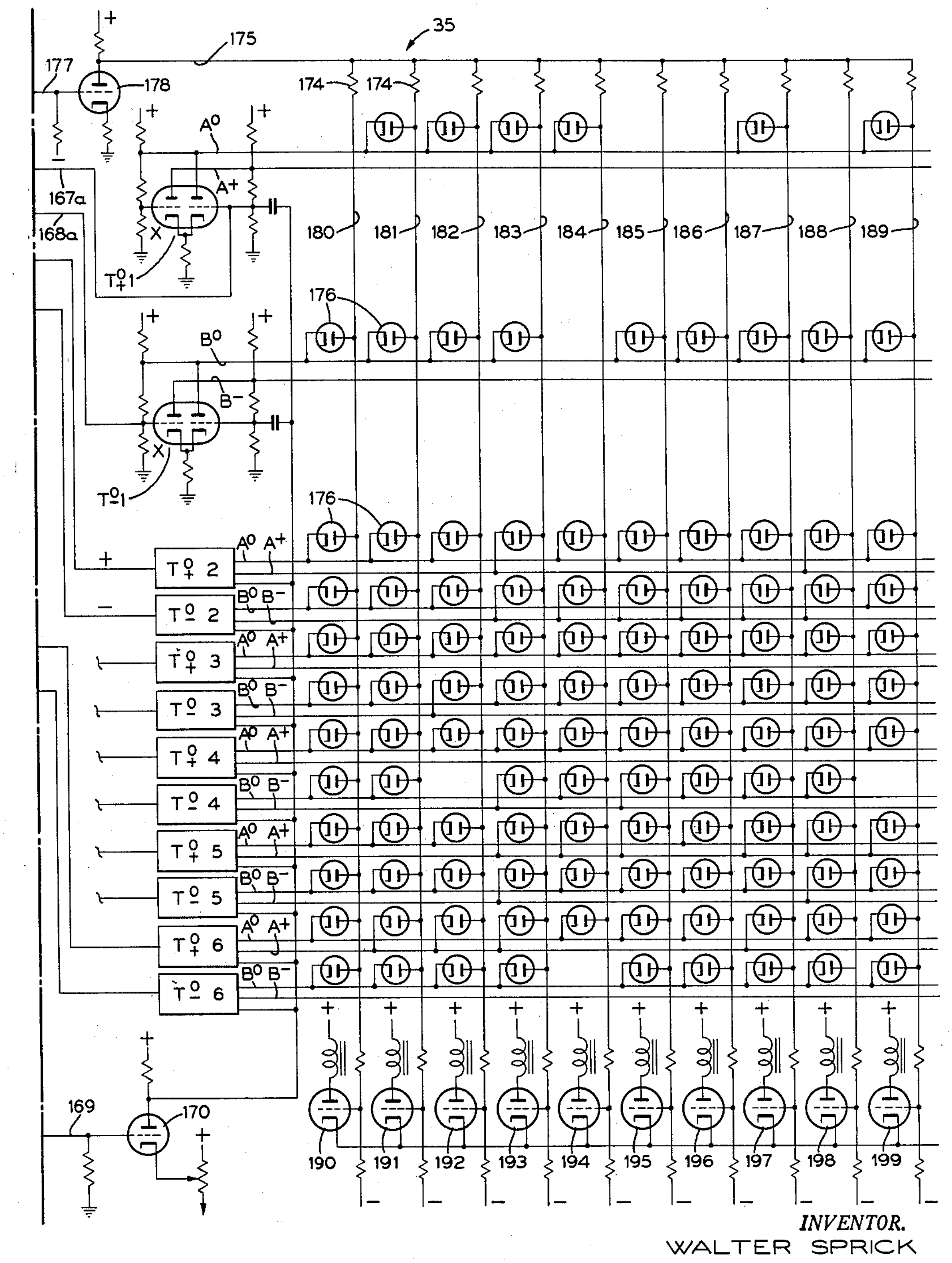
Figure 6:
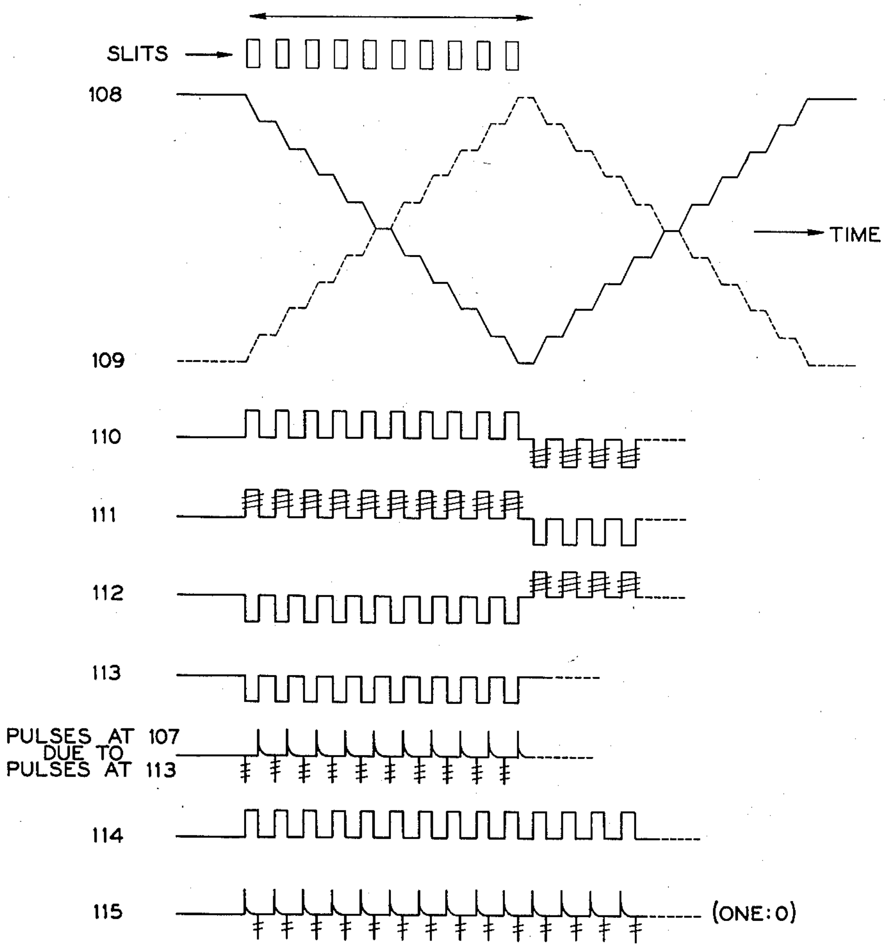
Figure 7:
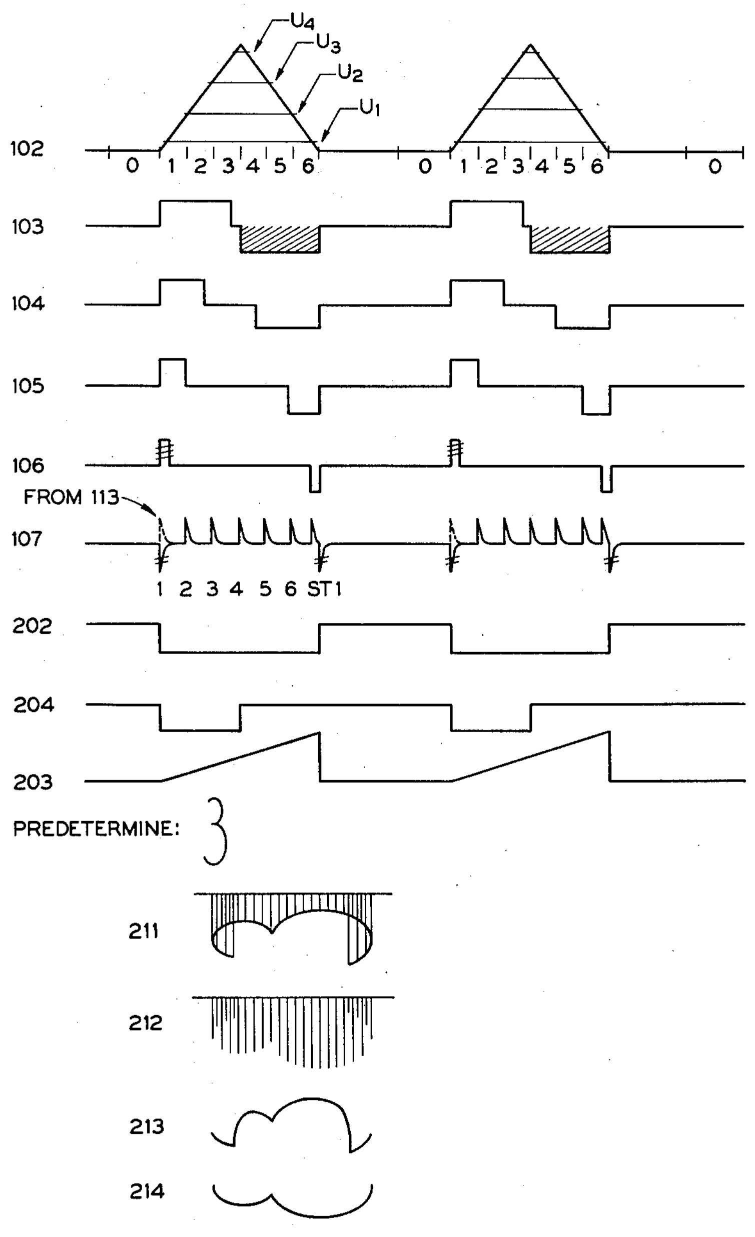
Figure 8:
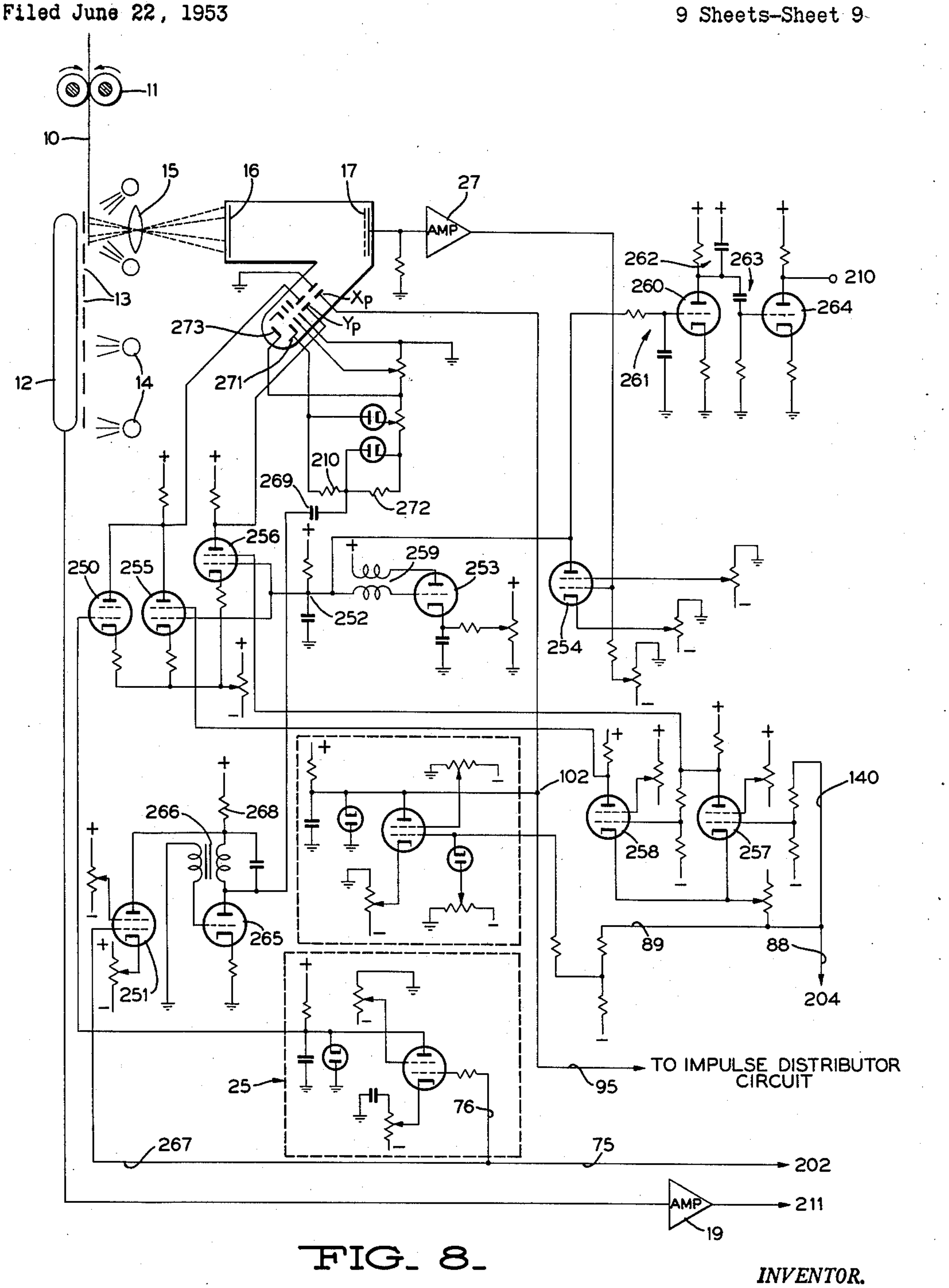

Fig. 4 shows the digits 0 to 9 with the arrows indicating the outline of the side of the digit scanned during zones 1 through 6 and shows the characteristic pulses obtained during the various zones from the envelope voltage characteristic of the digit outline;

Figs. 5*a*, 5*b*, 5*c* and 5*d* form a schematic electrical circuit diagram of the said one form of the invention;

Figs. 6 and 7 are diagrams of illustrative voltage waveforms obtained at different points in the circuitry of Figs. 5*a*, 5*b*, 5*c* and 5*d*; and Fig. 8 is a schematic diagram of a modified form of the scanning arrangement for the present invention.

Similar reference characters represent similar parts throughout the several views.

Figure 1:
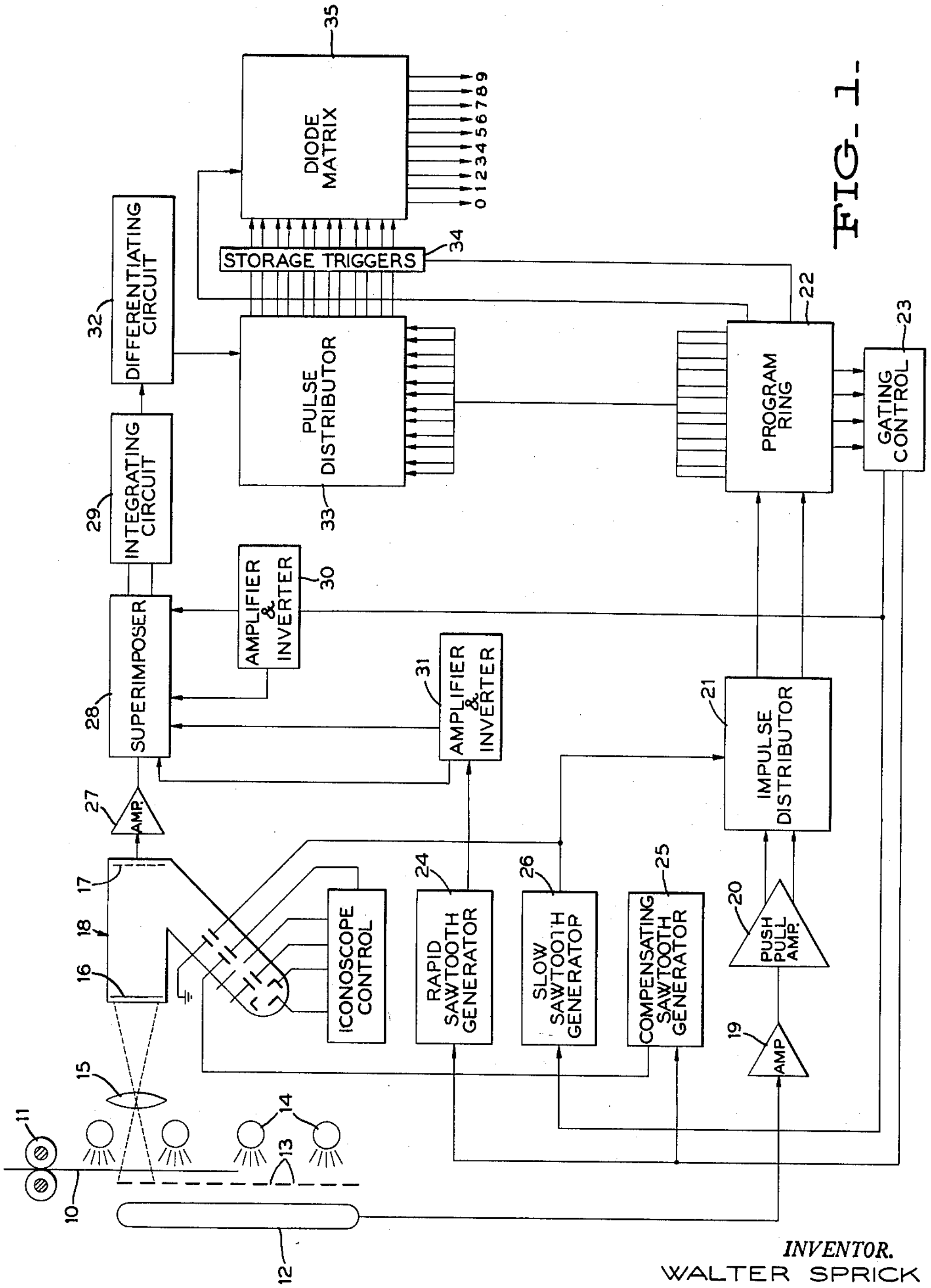
Fig. 1 is a schematic block diagram of one form of the present invention.

Fig. 1 shows a schematic diagram in block form of a preferred embodiment of the invention. Briefly, a card 10 is adapted to be fed by rolls 11 in front of a photocell 12. A plurality of slits 13 are arranged between the card and the photocell. A plurality of light sources 14 are arranged to supply light through the slits to the photocell. Card 10 is arranged with a number of fields which is identical with the number of slits 13. Each field is adapted to have a numeral entered therein and it is this numeral which is to be read. The numerals are arranged in a side-by-side manner and are adapted to be focused by lens 15 upon photocathode 16 and signal plate 17 of iconoscope 18.

As card 10 passes over the individual slits a scanning sweep is initiated. As the card progresses to cover the slits, the voltage output from the photocell is lowered in steps. This potential is supplied to an amplifier 19. The output voltage is fed to a push-pull amplifier 20. The output voltages from the last named amplifier are in phase opposition and are supplied to an impulse distributor circuit 21. Here the voltages are used to generate the pulses which are used to initiate the operation of program ring 22.

Each number on the card is adapted to be scanned, the output signals being divided into six zones. The program ring, when initiated, supplies a voltage signal through the gating control circuit 23 to the rapid sawtooth generator 24, a compensating sawtooth generator 25, and a slow sawtooth generator 26. The output voltages from these three generators are supplied to the iconoscope to cause a scanning of the number which is focused on the signal plate thereof.

The output from generator 26 is also fed to the impulse distribution circuit 21 to provide pulses for distinguishing the various zones during which scanning takes place. These pulses, in turn, are fed to the program ring 22 to impulse the triggers therein.

As the scanning takes place, output pulses will occur each time the scanning beam intercepts a portion of the number. These pulses are supplied from the iconoscope to amplifier 27 where they are amplified and fed to superimposer 28. The rapid sawtooth voltage from generator 24 is fed to amplifier and inverter 31, the output of which is a sawtooth voltage similar to that at generator 24 and an inverted form thereof. These two voltages are fed to superimposer 28 and determine the height of the pulses.

Control pulses from program ring 22 are fed through gating control 23 and amplifier and inverter 30 to the superimposer to separate one half of the scanning time from the other half thereof. The output pulses from the superimposer, as divided by the last named gating pulses, are supplied to an integrating circuit 29 where the different height pulses are reduced to an envelope voltage. The envelope voltage is then differentiated in differentiating circuit 32 and supplied as pulses to a pulse distributor 33.

The output pulses from pulse distributor 33 are fed to a group of storage triggers, illustrated by numeral 34, under the control of the program ring 22. At a predetermined time the program ring supplies a pulse to the diode matrix 35 which is set up by the triggers in box 34. The diode matrix is such that a particular circuit is made in accordance with which number is read from the card. This circuit can then control a punch or any other desired device.

Figure 3:
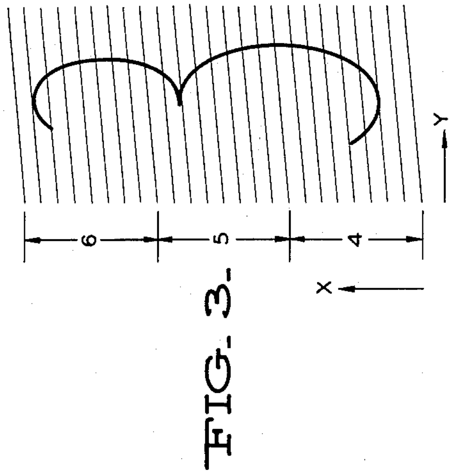
Fig. 3 is a schematic illustration of the scanning trace of the said one form of the invention across a symbol during the second three zones of scanning.
Figure 2:
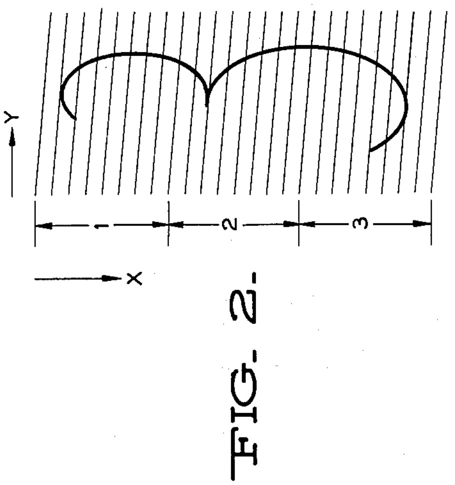
Fig. 2 is a schematic illustration of the scanning trace of the said one form of the invention across a symbol during the first three zones of scanning.

In greater detail, reference is made to Figs. 2, 3, 4, 5*a*, 5*b*, 5*c* and 5*d*. Figs. 5*a*, 5*b*, 5*c* and 5*d* should be placed one adjacent the other to obtain a better understanding of the entire circuit arrangement. As shown in Figs. 2 and 3, scanning of the numeral 3, by way of example, is divided into zones 1, 2, 3, 4, 5, 6. In Fig. 2, the scanning beam moves rapidly in the Y-direction and slowly in the X-direction from the top of the numeral to the bottom. The beam then reverses in the X-direction and travels back up to the top of the numeral, the rapid scanning in the Y-direction continuing as before. The downward scanning is divided into zones 1, 2 and 3 while the upward scanning is divided into zones 4, 5 and 6. It will be seen that each time the scanning beam intercepts a portion of the numeral an output signal will be obtained.

To initiate the scanning of one numeral, the leading edge of card 10 passes over one of the slots 13. At this time the voltage output from the photocell decreases in a step fashion. The photocell voltage is supplied to amplifier 19. From amplifier 19 the voltage is supplied to the input stage of push-pull amplifier 20. The input stage is in the form of a triode 50 which supplies an output voltage from the plate thereof which is the inverted form of the photocell voltage output. This voltage is capacitively coupled to point 109, the voltage curve at this point being shown in Fig. 6, it being understood that each step is caused by the leading edge of the card covering succeeding slots. The voltage from the plate of tube 50 is also supplied to the grid of triode 51, the output voltage of which is capacitively coupled to point 108, the voltage curve at this point being shown in Fig. 6.

The voltage appearing at point 109 is fed through an RC network 52 (Fig. 5*b*) and a resistor 53 to a point 110 which is common to the grid of a triode 54 and the cathode of a clipping diode 55. RC network 52 changes the stepping voltage to a series of pulses, there being one pulse for each step. These pulses, as they occur at point 110, are shown in Fig. 6. It will be noted that the negative pulses which occur as the trailing edge of the card begins to open up the slots are shown cross-hatched since they are clipped by diode 55. The output from the plate of triode 54 at point 113 is in the form of a series of negative pulses due to the inversion in the triode, these pulses being shown in Fig. 6. These pulses are supplied to an RC differentiating network 56, the output of which takes the form of a series of sharp positive and negative pulses, there being first a negative and then a positive pulse out for each pulse applied to the network. These pulses are supplied through resistor 57 across a diode 58 to the grid of a triode 59. Diode 58 acts to clip the negative pulses so that only the positive pulses are applied to triode 59. The plate voltage of triode 59 is capacitively coupled through a shifting buss line 60 to the left side of each of a plurality of bi-stable flip-flop triggers, said triggers being labeled 0, 1, 2, 3, 4, 5, 6 and S*t*1. The sides of the triggers which are normally conducting are designated by an X. That is, when the side marked X is conducting, the trigger is in an "off" condition. The arrangement is such that only one trigger can be "on" at one time. The cathodes of all left side tubes of the triggers are connected to a common cathode resistance R*x* having such a value that the anode current of one tube unit will block all others. That is, any "on" tube will be extinguished when another one is fired.

The voltage appearing at point 109, Fig. 5*a*, is also applied through an RC network 61 (Fig. 5*b*) and a resistor 62 to a point 111 which is common to the grid of a triode 63 and the plate of a clipping diode 64. The pulses appearing at point 111 are shown in Fig. 6, it being understood that the cross-hatched positive pulses are clipped by diode 64. Therefore, no pulses are received by triode 63 until the trailing edge of the card begins uncovering slits. The output voltage from triode 63 is in the form of a series of negative pulses. These pulses are connected to a point 114.

The voltage appearing at point 108 (Fig. 5*a*) is applied through an RC network 65 (Fig. 5*b*) and a resistor 66 to a point 112 common to the grid of a triode 67 and the cathode of a clipping diode 68. The steplike voltage is changed into pulses by the RC network. The pulses are shown in Fig. 6 as they appear at point 112. It will be noted that diode 68 clips the positive pulses, allowing only the negative pulses to go through to the triode. The output pulses from triode 67 are positive and appear at point 114, these pulses appearing only while the card 10 is covering up slits. Therefore, at point 114, the voltage is in the form of a series of positive pulses, there being a pulse which occurs each time a slit is covered and each time a slit is uncovered. The pulses at point 114 are applied through an RC differentiating network 69 and a resistor 70 to a point 115 common to the grid of a triode 71 and the cathode of a clipping diode 72. As shown in Fig. 6, the negative pulses appearing after differentiation in network 69 are clipped by diode 72, these negative pulses being cross-hatched. The output voltage on the plate of triode 71 is in the form of a series of negative pulses which are capacitively coupled to a line 73 connected to the right side of trigger 0.

When the negative pulse on line 73 reaches the right side of the trigger 0, the tube is turned "on," that is, the left side begins conducting. This occurs when the card 10 begins to cover the slit. When card 10 covers the slit the pulse on line 60, previously mentioned, occurs and causes trigger 0 to turn "off" sensing a positive carry pulse to the left side of trigger 1 so as to turn trigger 1 "on." Thus, it is time for scanning of the numeral on the card to commence.

A triode 74 is provided and has its grid connected to the plate of the right side of trigger 0. The arrangement is such that when the right side is not conducting, i. e., when trigger 0 is "on," the cathode of triode 74 is relatively positive. As soon as trigger 0 is turned "off" and trigger 1 is turned "on," the cathode potential of triode 74 drops. This cathode voltage, as seen at point 202, is shown in Fig. 7. This voltage is applied through lines 75 and 76 to the control grid of a tetrode 77 in the compensating sawtooth generator 25, Fig. 5*a*, and through lines 75 and 78 to the control grid of tetrode 79 in the rapid sawtooth generator 24. The relatively negative voltage applied to the tubes when trigger 1 is turned "on" has the effect of blocking tubes 77 and 79.

The compensating sawtooth generator 25 provides a voltage which compensates for the movement of the numeral during the scanning operation. The means for generating the sawtooth includes the RC circuit 80 having a resistor 81 and a capacitor 82. A positive charging voltage is applied to resistor 81 which will charge capacitor 82 providing tube 77 is not conducting. The plate of tetrode 77 is connected to a point between the resistor and capacitor and to the cathode of a diode 83. As soon as tetrode 77 is blocked by the program ring, i. e., when trigger 1 turns "on," capacitor 82 begins charging. This voltage is applied to one of the plates Y*p* in the iconoscope. Diode 83 prevents the voltage from ever being negative.

The rapid sawtooth generator 24 provides a voltage which causes the beam to rapidly move in the Y-direction. This generator includes an RC circuit 84 which charges in the same manner as network 80. However, the RC time constant is different. Charging circuit 84 begins charging as soon as tetrode 79 is blocked. The charge on the capacitor of RC circuit 84 is applied through one winding of a transformer 85 to the grid of a triode 86. As soon as the charging voltage reaches a predetermined value tube 86 conducts causing a current to flow in the other side of the transformer. When this occurs a voltage is induced in the said one side of the transformer to discharge the capacitor. Then tube 86 is cut off. It will be seen that tube 86 and the associated transformer act as a blocking oscillator to control the generation of the sawtooth voltages in network 84. These sawtooth voltages are applied to the other of the deflection plates Y*p* of the iconoscope. The arrangement is such that only one compensating sawtooth voltage is generated during the entire scanning operation while a large number of rapid sawtooth voltages are produced.

At the time trigger 1, Fig. 5*c*, is turned "on" the plate voltage on the right side thereof increases and is applied to the grid of a triode 87 causing the tube to conduct, dropping the plate voltage. This relatively negative voltage as seen at point 204, is shown in Fig. 7, and is applied through lines 88 and 89 to the control grid of tetrode 90 in the slow sawtooth generator 26. When such a relatively negative voltage is applied tube 90 is blocked permitting RC network 91 to begin charging. Diode 92 acts to prevent the charging capacitor from going negative. The time constant of RC network 91 is such that it builds up to a peak voltage slowly and then discharges slowly, generating a voltage, as seen at point 102, approximating that shown in Fig. 7. The voltage builds up during zones 1, 2 and 3 and decays during zones 4, 5 and 6.

While as yet there has been no explanation as to how the triggers are stepped along, let it be assumed that pulses are obtained on the shifting buss line 60 to cause triggers 2, 3, 4, 5, 6 and S*t*1 to turn "on" successively. As shown in Fig. 5*c*, triodes 87, 93 and 94 form an "or" circuit. The grid of tetrode 93 is connected to the plate of the right side of trigger 2 while triode 94 is connected to the plate of the right side of trigger 3 (not shown). While triggers 3, 4 and 5 have not been shown it is believed sufficient to state that they are connected in between triggers 2 and 6 in the same manner that triggers 0, 1 and 2 are connected. When trigger 2 turns "on" due to a negative pulse being applied to the grid of the "left" side thereof tube 93 begins conducting so as to continue the relatively negative voltage at point 204. When trigger 3 turns "on" triode 93 stops conducting and triode 94 begins conducting so as to continue the same relatively negative voltage at point 204. Therefore, during zones 1, 2 and 3 the triodes 87, 93 and 94 block tetrode 90 in the slow sawtooth generator 24, Fig. 5*a*, from conducting. When trigger 4 (not shown) turns "on," triode 94 turns off and a relatively positive voltage is applied to point 204. This voltage causes tetrode 90 in the slow sawtooth generator to begin conducting. However, tube 90 is conductive only so far that it opposes the constant charging only gradually, which, after some time, does cause a complete decrease of the charging capacitor voltage. This can be achieved by a suitable selection of the operating point of tube 90 together with the potential from the triodes 87, 93 and 94. The voltage at the charging capacitor is to be normally at zero, then to increase in the opening time until blocking occurs, and thereafter the voltage is gradually to decrease in about the same period of time until zero volts is reached. This gradual decrease in charging voltage occurs over zones 4, 5 and 6, therefore causing the scanning beam to reverse directions insofar as the X-direction is concerned and go back up the numeral to the point of beginning. This voltage, as seen at point 102 is applied to one of the plates X*p* in the iconoscope.

The slow sawtooth voltage appearing at point 102 is also applied through line 95 to the impulse distributor circuit 21, Fig. 5*b*. It is this last named circuit which is to furnish the negative pulses to the shifting buss 60 to step the triggers along in succession. The voltage on line 95 is applied through appropriate resistors to the plates of diodes 96, 97, 98 and 99. The cathodes of the aforementioned diodes are connected at different points on a resistor 120. One end of resistor 120 is grounded while the other end thereof has a positive potential applied thereto. The potentials for the cathodes 96, 97, 98 and 99 are designated as $U_1$, $U_2$, $U_3$ and $U_4$, respectively. These levels of potential are shown superimposed on the sawtooth voltage appearing at point 102 in Fig. 7. The arrangement is such that when the charging capacitor voltage of network 91 reaches the potential $U_1$, tube 96 begins to conduct so that this potential is applied to an RC differentiating network 121 and appears at point 106 as shown in Fig. 7. When the charging capacitor potential reaches potential $U_2$, tube 97 begins to conduct and conducts until the sawtooth potential goes below potential $U_2$. The voltage on the plate of tube 97 is applied to an RC differentiating network 122 and appears at point 105 as shown in Fig. 7. Diodes 98 and 99 begin to conduct when the charging capacitor reaches potentials $U_3$ and $U_4$, respectively, and the potential on the plates thereof is applied to RC differentiating networks 123 and 124, respectively. The potentials out of RC networks 123 and 124 appear at points 104 and 103, respectively, and are shown in Fig. 7.

The potentials at point 106, after passing through an appropriate resistor, are applied across a diode 125 to clip the positive potential which is cross-hatched in Fig. 7. Therefore, the grid of triode 126 sees only the negative potential. The potentials at points 105 and 104, respectively, appear on the grids of triodes 127 and 128, respectively. The potentials at points 103, after passing through a suitable resistor are applied across a diode 129 where the negative potential is clipped. Therefore, the grid of triode 130 sees only the positive potential. In triodes 126, 127, 128 and 130 the potentials applied thereto are inverted and applied to the RC differentiating network 56 and appear as pulses at point 107. As shown in Fig. 7, the solid line negative pulse which first appears is cross-hatched since this pulse is caused due to the rising potential applied to tubes 127, 128 and 130 as the capacitor is charging. The reasons for clipping this first negative pulse at diode 58 are first, because it is not usable on the shifting buss 60 for the program ring triggers, and second, because the dotted line positive-pulse which occurs at the same time is the starting pulse from triode 54 which turns trigger 1 "on" to commence the scanning operation.

The positive pulses which occur at point 107 following the aforementioned dotted line positive pulse, occur as the rapid sawtooth passes from one zone to another. As shown in Fig. 7 the voltage at point 105 builds up quickly and then drops back to zero. This voltage, after being sent through triode 127 and RC differentiating network 56 appears as the first negative pulse which is cross-hatched and the positive pulse at time 2. That is, when the voltage at point 105 is inverted in triode 127 it will appear as a negative voltage. As the pulse first goes negative the RC network has the effect of producing a sharp negative pulse which decays immediately. As the negative voltage goes back to the reference potential a sharp positive pulse is provided at point 107. This positive pulse is the pulse occurring at time 2 which is the time scanning begins in zone 2. The positive pulse at time 3 at point 107 is obtained from point 104 in a manner similar to the way the pulse at time 2 was provided. The positive pulses occurring at point 107 at times 4, 5, 6 and S*t*1 come from the negatively going voltages at points 103, 104, 105 and 106, respectively, in timed succession. The cross-hatched negative pulse which occurs immediately following the positive pulse at time S*t*1 is a result of the final decay of the voltage at points 106, 105 and 104. This negative pulse is clipped by diode 58.

It should be borne in mind that the solid line positive pulses which occur at times 2, 3, 4, 5, 6 and S*t*1 at point 107 are pulses which are generated between succeeding dotted line positive pulses. The dotted line positive pulses are generated by the card 10 completely covering a slit in front of the photocell 12 and are used to turn trigger 0 "off" and trigger 1 "on." After trigger 1 is turned "on" scanning is initiated in zone 1 of the numeral. When the scanning beam enters zone 2, the first solid line positive pulse at point 107 is produced. As the following zones 3 through 6 are entered the remaining positive pulses are generated. The positive pulse which occurs at time S*t*1 is utilized to turn "on" trigger S*t*1. When this trigger is turned "on" all scanning of the numeral is completed, i. e., all six zones have been scanned. Trigger S*t*1 stays "on" until the leading edge of the card begins to cover another slit to generate a positive pulse, as seen at point 116, Fig. 5*b*, which becomes a negative pulse after passing through triode 71, to turn trigger 0 "on." When this occurs, trigger S*t*1 turns "off."

Scanning of the numeral is stopped when trigger S*t*1 is turned "on." That is, when trigger S*t*1 turns "on" the plate on the right side thereof rises and supplies a higher positive potential to the grid of a triode 131, which, together with triode 74 forms a second "or" circuit. When the higher positive potential reaches the grid of triode 131 the tube conducts causing the voltage on the cathode thereof to rise. This voltage is seen at point 202 and is shown in Fig. 7. When the voltage at point 202 rises as aforementioned, triodes 77 and 79 in sawtooth generators 25 and 24, respectively, Fig. 5*a*, begin conducting and therefore block the charging in networks 80 and 84, keeping the charging capacitor voltage down. When trigger 0 is turned "on," the cathode of triode 74, Fig. 5*c*, rises to keep the potential at point 202 up, thus keeping networks 80 and 84 blocked.

To this point the scanning of the numeral and the manner of separating the various zones have been described. Now, the manner of identifying the numeral will be explained. As the scanning beam intercepts a portion of the image of the numeral a pulse is supplied from the signal plate 17 of the iconoscope, Fig. 5*a*. These pulses are amplified in amplifier 27 and fed through an appropriate resistor to the plate of a diode 132, the cathode of said diode being biased positively to clip all of the image pulses to the same height. From the plate of the diode the pulses are capacitively coupled to a point 133, from which the pulses are fed through a capacitor 134 and line 138 to the control grid of a tetrode 135, Fig. 5*b*, and through a capacitor 136 and line 139 to the control grid of a tetrode 137, both of said tetrodes forming a part of superimposer 28.

The arrangement is such that the control grid of tetrode 135 sees the image pulses which occur only during zones 1, 2 and 3 and the control grid of tetrode 137 sees only the image pulses which occur during zones 4, 5 and 6. To accomplish this, the potential at point 204, Fig. 5*c*, which is relatively positive during times 0, 4, 5, 6 and S*t*1 and relatively negative during times 1, 2 and 3, is applied through lines 88 and 140 to the control grid of a triode 141 which is a part of the amplifier and inverter 30. This tube will be cut off during times 1, 2 and 3 due to the relatively negative voltage applied thereto. Therefore, during times 1, 2 and 3 this plate voltage will be up. When the plate voltage is applied through an appropriate resistor to the control grid of tube 135, tube 135 will be permitted to conduct during these times only. The plate voltage from tube 141 is also applied to the control grid of triode 142 which is also a part of amplifier and inverter 30. During times 1, 2 and 3 triode 142 will conduct so that the plate thereof will be pulled down in potential. When this lowered potential is applied through an appropriate resistor to the control grid of tube 137, this tube will be cut off. Therefore, during times 0, 4, 5, 6 and S*t*1 tube 137 will be permitted to conduct. Only times 4, 5 and 6 are important since it is the image pulses which occur during these zones of scanning that it is desirable to have the control grid of triode 137 see. Since no image pulses occur during times 0 and S*t*1 the output of the tube is not affected.

To provide significance to the image pulses an arrangement is furnished whereby the image pulses, after passing through tetrode 135, will be given a magnitude proportional to the distance of the image point from the point where the scanning beam started the rapid sweep. To accomplish this, the rapid sawtooth voltage from generator 24 is applied to amplifier and inverter 31, Fig. 5*a*. The voltage is applied to a triode 143 which inverts the sawtooth so that the plate voltage begins high and gradually decreases. This inverted sawtooth voltage is applied to the screen grid of tetrode 135, Fig. 5*b*, through line 145, and to the control grid of a second triode 144. The plate output of triode 144 begins at a low voltage and gradually increases and is applied through line 146 to the screen grid of tetrode 137.

The pulses which occur during times 1, 2 and 3 reach the control grid of tetrode 135. From Fig. 2 it will be seen that an image pulse which occurs further from the starting point in the X-direction occurs at a later time in the sawtooth, i. e., when the sawtooth voltage is higher. To obtain a pulse out of tetrode 135 which is proportional to the distance of the image point from the horizontal sweep starting point, the screen grid of the tetrode has a sawtooth voltage applied thereto which is the reverse of the sweep sawtooth. If two image pulses occur during one horizontal sweep the image pulse occurring first will pull the plate of the tetrode down further than the image point which occurs second. By way of example, the image pulses obtained in scanning the numeral three, as seen at point 211, are shown in Fig. 7.

Tetrode 137 has the same phase sawtooth voltage applied thereto as do the deflection plates X*p* of the iconoscope. During times 4, 5 and 6 the image pulses occurring earliest in time during a horizontal sweep cause the plate voltage to drop less than image pulses occurring later in time. That is, the latest occurring pulses in a horizontal sweep will have the effect of pulling the plate voltage down further. The pulses obtained in scanning the numeral three during zones 4, 5 and 6, as seen at point 212, are shown in Fig. 7.

By comparing the pulses at points 211 and 212, it will be seen that the ends of the longest pulses at point 211 form an envelope similar to one side of the numeral three and the ends of the longest pulses at point 212 form an envelope similar to the other side of the numeral three. Therefore, during zones 1, 2 and 3, one side of the numeral is analyzed, and during zones 4, 5 and 6, the other side is analyzed.

The pulses occurring at point 211 are applied to one portion of integrating circuit 29, illustrated by reference numeral 147. Circuit 147 includes a diode 148, a capacitor 149 and a resistor 150. The cathode of the diode is connected to receive the pulses and the capacitor and resistor are connected in parallel and placed across the plate of the diode. The sides of the capacitor and resistor not connected to the diode plate are connected to a positive potential. The effect of the integrating circuit is to form an envelope voltage whose outline follows the longest pulses in the input thereto. This voltage, as seen at point 213, is shown in Fig. 7. Integrating circuit 151, which receives pulses from the plate of tetrode 137, is identical with integrating circuit 147 and provides an envelope voltage whose outline follows the longest pulses in the input thereto. This voltage, as seen at point 214, is shown in Fig. 7.

The envelope voltage occurring at point 213 is applied through a capacitor 152 and across a resistor 153 to the third grid of a pentode 154. The envelope voltage occurring at point 214 is applied through a capacitor 155 and across a resistor 156 to the first grid of said pentode. The plate of the pentode is connected to a positive potential and the cathode is connected through a resistor 157 to ground. The pentode output is taken from the second grid thereof which is connected through a capacitor 158 to a positive potential and through a resistor 159 to a positive potential. The capacitor and resistor are connected in parallel across the second grid output.

The arrangement is such that during times 1, 2 and 3 the third grid controls and during times 4, 5 and 6 the first grid controls. When the third grid controls operation, the second grid output potential rises and falls with the third grid applied potential. When the first grid controls, the second grid output potential is in phase opposition with the first grid input potential. This voltage is fed through an RC differentiating network 32 which provides pulses corresponding to the differential of the envelope voltage applied thereto. These pulses are applied to the control grid of a triode 161 where the pulses are inverted and applied through a line 162 to pulse distributor circuit 33, Fig. 5*c*.

It should be understood at this point that the side of the numeral which is examined first, i. e., during zones 1, 2 and 3, is dependent on whether the horizontal sweep is from left to right or right to left, and the form of the sawtooth voltage supplied to the screen grid of the tetrode associated with zones 1, 2 and 3. Whichever side is examined first during zones 1, 2 and 3, the opposite side is examined during zones 4, 5 and 6. This is easily accomplished by applying an opposite phase sawtooth voltage to the screen grid of the tetrode associated with zones 4, 5 and 6.

Fig. 4 shows, by way of example, the manner in which the digits 0 through 9 may be analyzed. During zones 1, 2 and 3 the outline of the right side of the digits is analyzed, and during zones 4, 5 and 6, the outline of the left side of the digits is analyzed. Assuming that the outlines aforementioned are obtained as envelope votlages, the differentiation thereof provides the pulses shown at one side of the digit. The direction of scanning is indicated by appropriate arrows.

It will be noted that characteristic pulses occur during certain of zones 1 through 6 for the different digits. These pulses may be broken down into the following code:

| | |
|---|---|
| No pulse | 0=0 |
| Positive pulse | +=1 |
| Negative pulse | −=2 |
| Positive and negative pulse | +=3 |

On the basis of the derivatives shown in Fig. 2 a codification of all the digits may be made according to the following impulse diagram.

| Digit | Zones | | | | | |
|---|---|---|---|---|---|---|
| | 1 | 2 | 3 | 4 | 5 | 6 |
| 0 | 0 | 0 | 0 | 0 | 0 | 0 |
| 1 | 0 | 0 | 0 | 0 | 0 | 1 |
| 2 | 0 | 0 | 2 | *u* | 0 | 1 |
| 3 | 0 | 3 | 0 | 2 | 3 | 1 |
| 4 | 2 | 2 | 0 | 0 | 1 | 0 |
| 5 | 1 | 2 | 0 | 2 | 1 | 0 |
| 6 | 1 | 2 | 0 | 0 | 0 | 0 |
| 7 | 0 | 2 | 0 | 0 | 1 | 1 |
| 8 | 0 | 3 | 0 | 0 | 3 | 0 |
| 9 | 0 | 0 | 0 | 2 | 1 | 0 |

The symbol *u* means that the impulse is indefinite, depending on the type of writing. Certain ambiguities may exist for a number of the digits in certain zones, here again depending on the type of writing. However, an unambiguous coordination of all the digits may be made which is sufficient to distinguish any one digit from the other. In the codification the terminal points of the figures have not been taken into consideration at all. If these discontinuities are also included, there will appear further characteristic marks of difference, which, particularly in the representation of letters, may become of importance.

Based on the above impulse diagram for the digits shown in Fig. 4, the details of the analyzing apparatus will now be described. Reference is made to Figs. 5*c* and 5*d*. In Fig. 5*c* the positive and negative derivative pulses, which appear on line 162, are applied to a plurality of zone pulse distribution lines. While only the pulse distribution lines have been shown for zones 1, 2 and 6 it will be understood that zones 3, 4 and 5 are identical and are connected in a similar manner. In view of the similarity only the details of zone 1 will be described.

The pulses from line 162 are applied through capacitors 163 and 164 to lines 165 and 166, respectively. Line 165 connects to the plate of a diode 167 which allows only the positive derivative pulses to pass therethrough. Line 166 connects to the cathode of diode 168 which allows only the negative derivative pulses to pass therethrough. The cathode of diode 167 is connected to a 160 v. power supply and the plate of diode 168 is connected to a 40 v. power supply. To assure that only the positive and negative pulses which occur during zone 1 of the scanning operation reach diodes 167 and 168, respectively, trigger 1 in the program ring is utilized. It will be remembered that during the scanning of zone 1, trigger 1 is turned "on." That is, the plate of the left side thereof is down in potential and the plate of the right side thereof is up. By connecting the plate of the left side to line 166 and the plate of the right side to line 165, these voltages will permit pulses to pass through diodes 167 and 168 only during zone 1 scanning. By way of further explanation, the voltage applied to line 165 pulls the plate of diode 167 almost up to the level of the cathode potential. When a positive pulse occurs during zone 1, this pulse causes the diode to conduct. The voltage applied to line 166 pulls the cathode of diode 168 almost down to the plate voltage. When a negative pulse occurs during zone 1, this pulse causes the diode to conduct. During zones 2 through 6 no pulses can pass through zone 1 since the plate potentials of trigger 1 are reversed at these times.

The pulse distributor lines for zones 2, 3, 4, 5 and 6 are connected to triggers 2, 3, 4, 5 and 6, respectively, in the same manner in which the pulse distributor lines for zone 1 are connected to trigger 1. Therefore, the pulses occurring during these zones can only pass through the distribution lines identified therewith.

The pulses from pulse distributor 33 are applied to the group of triggers shown in Fig. 5*d*. Only the triggers $T_{+}^{0}1$ and $T_{-}^{0}1$ are shown in detail. These triggers are associated with each of the zone pulse distribution lines and are labeled on the drawing as $T_{+}^{0}2$, $T_{-}^{0}2$, $T_{+}^{0}3$, $T_{-}^{0}3$, $T_{+}^{0}4$, $T_{-}^{0}4$, $T_{+}^{0}5$, $T_{-}^{0}5$, $T_{+}^{0}6$ and $T_{-}^{0}6$. These triggers are shown in block form only. The details of triggers $T_{+}^{0}1$ and $T_{-}^{0}1$ will be explained to serve as a guide for understanding how the remaining triggers operate.

The positive pulses from diode 167, Fig. 5*c*, are applied through line 167*a* to the control grid of the right side of trigger $T_{+}^{0}1$, Fig. 5*d*, while the negative pulses from diode 168 are applied through line 168*a* to the control grid of the left side of trigger $T_{-}^{0}1$. As denoted by the X adjacent the left side of each trigger, this is the side which is normally conducting. That is, when the left sides of the triggers are conducting the triggers are considered "off." When a positive pulse is received by trigger $T_{+}^{0}1$ the trigger is turned "on" so that line $A^0$, connected to the plate of the right side, drops in potential while line $A^+$, connected to the plate of the left side, rises in potential. When a negative pulse is received by trigger $T_{-}^{0}1$ the trigger is turned "on" so that line $B^0$, connected to the plate of the right side, drops in potential, while line $B^-$, connected to the plate of the left side, rises in potential. The remaining triggers will be turned "on" providing appropriate pulses are received from their associated pulse distribution lines. Lines $A^0$ and $A^+$ have been designated as 0 and +, respectively, to indicate that when a positive pulse is received by the trigger $T_{+}^{0}1$ to turn it "on," line $A^0$ is down and line $A^+$ is up. Lines $B^0$ and $B^-$ have been designated as 0 and —, respectively, to indicate that when a negative pulse is received by the trigger $T_{-}^{0}1$ to turn it "on," line $B^0$ is down and line $B^-$ is up. The remaining triggers having the prefix $T_{+}^{0}$ and $T_{-}^{0}$ have their output lines similarly designated.

The output lines from the group of storage triggers are connected to the diode matrix 35, shown in detail in Fig. 5*d*. The matrix includes a plurality of control lines 180, 181, 182, 183, 184, 185, 186, 187, 188 and 189, there being a control line for each of the digits 0–9. The last digit in each of the reference characters for the control line represents the digit which is to be identified with a particular line. One end of each of the control lines is connected through appropriate resistors 174 to a common line 175. The other end of each of control lines 180, 181, 182, 183, 184, 185, 186, 187, 188 and 189 is associated with the control grid of thyratrons 190, 191, 192, 193, 194, 195, 196, 197, 198 and 199, respectively. Here again, it will be noted that the last digit in the reference character for the thyratrons represents the digit to be identified therewith. Stated otherwise, when digit 1, by way of example, is read from card 10, the final output signal which identifies the digit as a "1," comes from thyratron 191 which is made conductive by the voltage appearing on control line 181. A plurality of diodes 176 are associated with the control lines and with the $A^0$, $A^+$, $B^0$ and $B^-$ lines from the storage triggers. The cathode of the diodes is associated with one of the last named lines while the anode is associated with one of the control lines.

A read pulse for the matrix is obtained from trigger S*t*1 in the program ring. The plate of the left side of this trigger connects through line 177 to the control grid of a triode 178, Fig. 5*d*. The arrangement is such that when the trigger S*t*1 turns "on" the voltage on the plate of the left side cuts off tube 178 so that the plate voltage from tube 178 rises. This plate voltage, by way of example, may be 150 volts. This voltage appears on common line 175 and can pass through only one of the control lines to the thyratron associated therewith. The particular control line over which the voltage passes is determined by the character being scanned. By way of example, if the digit 1 is being scanned, the diodes in the matrix will be set up so that only line 181 will have the 150 volt potential thereon to fire thyratron 191. All the other control lines will be blocked. That is, the potential thereon will be so low that they cannot fire their associated thyratrons.

In order to understand the manner in which the diode matrix determines the digit scanned, a typical example will be given for identifying the digit three. From Fig. 4, it will be seen that when the digit three is scanned, a positive and a negative pulse are obtained during zone 2 and 5, a negative pulse occurs in zone 4, and a positive pulse occurs in zone 6. These pulses show up on the storage triggers in Fig. 5*d*. No pulses occur during zone 1 so that lines $A^0$ and $A^+$ for trigger $T_{+}^{0}1$ are high and low, respectively, in potential. Lines $B^0$ and $B^-$ for trigger $T_{-}^{0}1$ are high and low, respectively, in potential. During zone 2 a positive and a negative pulse occur. The positive pulse lowers the potential on the $A^0$ line of trigger $T_{+}^{0}2$ and raises the potential on the $A^+$ line thereof. The negative pulse lowers the potential on the $B^0$ line of trigger $T_{-}^{0}2$ and raises the potential on the $B^-$ line. The zone 3 storage triggers condition the lines associated therewith in the same manner as those in zone 1. In zone 4 a negative pulse occurs. The $A^0$ and $A^+$ lines for trigger $T_{+}^{0}4$ are high and low, respectively, in potential. The $B^0$ and $B^-$ lines for trigger $T_{-}^{0}4$ are low and high, respectively, in potential. The zone 5 storage triggers condition the output lines associated therewith in the same manner as those in zone 2. A positive pulse occurs during zone 6. This pulse causes the $A^0$ and $A^+$ lines of trigger $T_{+}^{0}6$ to be low and high, respectively, in potential. The $B^0$ and $B^-$ lines for trigger $T_{-}^{0}6$ remain in their normal condition, i. e., high and low, respectively, in potential. It will be seen that none of the diodes associated with control line 183 and the $A^0$, $A^+$, $B^0$ and $B^-$ lines from the storage triggers will conduct. Therefore, the potential on line 183 will be high compared to the potential on the remaining control lines. The reason the diodes associated with control line 183 do not conduct is due to the fact that the cathodes thereof are above the plate potential. At least one diode associated with the remaining control lines conducts during the time the digit three is stored in the storage triggers. For example, during zone 4, the $B^0$ output line for trigger $T\text{–}^{0}4$ is low compared to the $B^-$ output line thereof. The diode associated with the $B^0$ line and control line 180 will conduct. Conduction begins as soon as the relatively high voltage is applied to line 180. Immediately, the plate potential drops and line 180 is brought down to substantially the potential of the cathode, there being a drop in potential across resistor 174. Therefore, the entire line 180 is made so low that thyratron 190 associated therewith cannot conduct.

It will be noted that certain diodes are missing from the matrix. This can be done as long as the pulse patterns for each digit can be distinguished, one from the other. It is sometimes advisable to leave out certain diodes which are associated with points which may not be present in different forms of the same digit. For example, a diode is not provided between the $B^-$ line for trigger $T\text{–}^{0}4$ and control line 182. A negative pulse will occur during zone 3 if the digit two shown in Fig. 4 is scanned. However, if the small curlicue at the base of the digit two is not present then a negative pulse will not be produced at this time. By leaving out the diode, either form of the digit two can be read and identified.

When one of the thyratrons associated with the matrix fires, a coil associated therewith may be used to control a recording device such as a punch.

When trigger 0 is turned "on" trigger S*t*1 turns "off." At this time the plate of the left side of trigger S*t*1 goes up so that a relatively high potential is applied through line 177 to triode 178, thereby dropping the potential on line 175. Thus, none of the thyratrons can conduct. At the same time, the high potential on the aforementioned trigger plate is fed through line 169 to the control grid of a triode 170. The plate of the last named triode drops in potential. This low potential is applied to the grid of the right side of all storage triggers and therefore resets them to an "off" condition, i. e., with all left sides conducting.

The overall operation of the form of the invention described above will now be explained in detail.

As the card 10 begins to cover one of the slits 13 in front of photocell 12, a negative pulse is applied to the grid of the right side of trigger 0 in the program ring. This turns the trigger "on." While trigger 0 is turned "on" the sawtooth generators 24, 25 and 26 will be blocked so that there is no output voltage therefrom. As soon as the card has completely covered the slit a negative pulse is applied from shifting buss 60 to the left side of trigger 0 turning the trigger "off." When this occurs, trigger 1 turns "on," causing the blocking tubes in the sawtooth generators to cut off. The rapid sawtooth voltage is applied to one of the deflection plates Y*p* of the iconoscope and the compensating sawtooth voltage is applied to the other of said plates Y*p*. The slow sawtooth voltage is applied to deflection plates X*p* and to the impulse distributor circuit 21. In circuit 21, the slow sawtooth voltage is divided into six usable pulses which are supplied to the shifting buss 60 for turning triggers 2, 3, 4, 5, 6 and S*t*1 "on" in succession.

The scanning of the digit on the card is divided into six zones. As the rapid sawtooth voltage carries the scanning beam across the digit, pulses occur upon the intersection of the beam with a portion of the digit. These pulses are amplified and clipped and supplied to the superimposer circuit 28. In one side of the superimposer circuit the pulses occurring during zones 1, 2 and 3 are provided with a magnitude proportional to the distance the scanning beam travels in its horizontal sweep, before it intercepts the digit. During zones 4, 5 and 6 a sawtooth voltage in the opposite phase is applied to the other half of the superimposer circuit so that the image pulses are given a magnitude proportional to the distance of the point of interception from the point where the scanning beam ends its rapid sweep. The superimposer output pulses are integrated so that an envelope forms during zones 1, 2 and 3 which is similar to the outline of one side of the digit. During zones 4, 5 and 6 an envelope voltage is formed similar to the outline of the other side of the digit. These envelope voltages are differentiated to provide characteristic pulses during certain zones for each digit, these pulses occurring at points of discontinuity or abrupt changes in slope of the envelope voltages. These pulses are applied through a plurality of pulse distribution lines to a plurality of storage triggers. The program ring operates to permit the pulses occurring during zone 1 to be sent to the zone 1 storage triggers, the pulses occurring during zone 2 to be sent to the zone 2 storage triggers, etc. After all the storage triggers have been set up, trigger S*t*1 in the program ring is turned "on" and reads the potentials from the triggers into diode matrix 35. In this matrix the character which has been scanned is identified from the pulses supplied thereto and may be used to operate a punch or other similar device.

In a modified form of the invention, as shown in Fig. 9, scanning is accomplished by a "captured spot" technique. Briefly, the same type of compensating sawtooth and slow sawtooth voltages are applied to the iconoscope deflection plates. The rapid sawtooth voltages begin in the same manner as has already been described. However, as soon as a portion of the digit is intercepted, the scanning beam follows the outline of the side of the digit it first intercepts from top to bottom. At the bottom of the digit the beam leaves the digit and scans as in the first form described. Then, the rapid and slow sawtooth voltages reverse their directions and scanning begins from the bottom to the top of the digit. As soon as the beam intercepts the lowest portion of the digit is follows the outline of the digit opposite to that followed on the way down until the beam leaves the upper end of the digit.

In detail, the card is moved between the slits and the light sources as in the form of the invention already disclosed. The image of a digit on the card is optically supplied to the iconoscope. When a signal is received to commence scanning, as in the first form of the invention, the potential on lines 75, 76 and 267 drops. When the potential on line 76 drops, the compensating sawtooth generator 25 begins supplying a saw tooth voltage. This voltage occurs during zones 1 through 6 and is supplied to the control grid of a tetrode 250. As the applied potential increases the plate voltage of tube 250 decreases, this plate voltage being connected to one of the deflection plates Y*p*. It will be remembered that during zones 1, 2 and 3 a comparatively low potential is applied through lines 88 and 89 to the slow sawtooth generator. The output voltage from the slow sawtooth generator goes to one of the deflection plates X*p* and to the impulse distributor circuit 21 via line 95.

The rapid sawtooth generator is somewhat different from that shown in Fig. 5*a* and is seen to include an RC charging network 252. As the charge on the capacitor of the network rises it is applied through one winding of a transformer 259 to the control grid of a triode 253. This circuit, just described, acts the same as that illustrated by numerals 84, 85 and 86 of Fig. 5*a*. However, in addition, the capacitor potential is applied to the plate of a pentode 254 which is normally off. The control grid of this pentode is connected to amplifier 27 which receives positive image pulses from the iconoscope.

The potential on the capacitor of network 252 is also applied to the control grids of tetrodes 255 and 256. The arrangement is such that during zones 1, 2 and 3, tetrode 256 conducts and applies a potential to one of the deflection plates $Y_p$, and during zones 4, 5 and 6, tetrode 255 conducts and applies a potential to the other of said deflection plates $Y_p$. To accomplish this, the potential on lines 88 and 140, which is relatively low during zones 1, 2 and 3, is applied to the control grid of tetrode 257. The plate voltage of tube 257 will now be relatively high during zones 1, 2 and 3. By supplying this voltage to the suppressor grid of tetrode 256, this tube will be permitted to conduct during these zones. The same plate voltage of tube 257 is applied to the control grid of tetrode 258 which inverts the voltage. This inverted voltage will be low during zones 1, 2 and 3 and high during zones 4, 5 and 6 and is applied to the suppressor grid of tetrode 255. Accordingly, tetrode 256 will be permitted to conduct during zones 1, 2 and 3 and tetrode 255 will be permitted to conduct during zones 4, 5 and 6. Thus, the scanning beam, by way of example, goes from left to right during zones 1, 2 and 3, and from right to left during zones 4, 5 and 6.

Assuming that the scanning beam goes from left to right during zones 1, 2 and 3 and progresses from the top of the scanning field to the bottom thereof, scanning will occur as in the first form of the invention until the uppermost portion of the digit being scanned is intercepted. At this time a positive pulse is applied to the control grid of pentode 254 from amplifier 27. This causes the pentode to conduct. The plate voltage thereof drops so that the charging capacitor voltage from network 252 begins to drop. Since this same charging voltage is applied to one of the deflection plates $Y_p$, the scanning beam first strikes the digit, producing an image pulse, and then backs off as the capacitor voltage drops. As soon as the beam backs off the digit, pentode 254 is cut off so as to allow the charging capacitor to build up again in potential until the beam strikes the digit again, at which time the same process is repeated. The slow sawtooth voltage causes the beam to move down the outline of one side of the digit. On the return trace, i. e., from bottom to top, the rapid sawtooth reverses causing scanning from right to left. In scanning up the digit, the beam follows the other side of the digit outline.

The voltage produced at the charging capacitor of network 252 will comprise the high frequency sawtooth voltages which occur before and after the scanning beam intercepts the digit outline, and a voltage which is somewhat similar to the outline of the side of the digit which is followed by the scanning beam. These voltages are supplied to the control grid of a triode 260. The rapid sawtooth voltages which occur before and after the outline of the digit is intercepted are filtered by RC networks 261 and 262 to provide a medium potential output during these times. The plate potential from triode 260 is passed through a CR differentiating network 263 to the control grid of a triode 264. The plate voltage of tube 264 is in phase opposition to the input voltage and is adapted to be supplied to the pulse distributor 33 and the remainder of the analyzing circuitry shown in Figs. 5*c* and 5*d*.

It will be noted that the voltages produced by this second method of scanning will be substantially identical with those produced by the first scanning method. For any variations which exist, the diode matrix may easily be rearranged to provide a correct identification of the digit.

To assure that the scanning beam is cut off during times 0 and *St*1, a blocking oscillator comprising a triode 265 and a transformer 266 is provided. It will be remembered that during times 0 and *St*1 a relatively positive voltage exists on line 75 from the multiple gate associated with the program ring. This voltage is applied through line 267 to the control grid of a triode 251. The plate of this triode is connected to a positive source of potential through a resistor 268. The plate of triode 265 connects through one side of transformer 266 to the plate of triode 251, there being a capacitor arranged in parallel with said one side of the transformer. The other side of the transformer connects to ground and the control grid of triode 265.

During times 1 through 6, triode 251 is cut off since line 267 has a relatively low voltage thereon. During this time, oscillations occur on the plate of triode 265, these oscillations being fed through a capacitor 269 and a resistor 270 to the control grid 271 of the iconoscope. A negative voltage of −1000 volts is also applied through resistors 272 and 270 to the control grid. As long as the oscillations occur, there is a voltage drop across resistors 272 and 270 so that the control grid is at a potential above the potential applied to cathode 273. This allows the beam of electrons to leave the cathode.

During times 0 and *St*1 triode 251 conducts so as to reduce the plate potential thereof. This cuts off the blocking oscillator. At this time, −1000 volts is applied to the control grid to cut the scanning beam off.

It will be seen from the above description that I have provided a character analyzing device which is capable of reading either printed or handwritten symbols on a card or other similar storage means and supplying an output signal indicative of the symbol read. This output signal may be used to control the operation of a punch or other forms of recording devices.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an analyzing device for reading characters and providing manifestations identifying said characters, a scanning station comprising means for scanning characters to be read which are advanced to said station, means for providing output signals when said scanning means senses portions of a character, means responsive to said output signals to provide a potential which varies with time in a manner to approximate the outline of said character, and means for analyzing said potential to provide a manifestation indicative of the character scanned.

2. In an analyzing device for reading characters and providing output signals identifying said characters, a record having a character thereon, a scanning station comprising scanning means adapted to scan a character at said station, means for moving said record past said scanning station, means responsive to the movement of said record to a predetermined position for initiating the scanning of said character, detector means for providing output signals when said scanning means senses portions of said character, means responsive to said output signals to provide a potential which varies with time to approximate the outline of said character as said character is being scanned, and means for analyzing said potential to provide a manifestation indicative of the character scanned.

3. In a character reading apparatus, a record having a character thereon, a scanning station comprising scanning means adapted to progressively scan said character in a plurality of sweeps, feed means for moving said record past said scanning station, circuit means responsive to the movement of said record for initiating the scanning of said character, means for providing output signals when said scanning means senses portions of said character, means responsive to said output signals to provide a potential which varies from a reference potential as the portion of the character first sensed on a sweep varies from a reference datum, means for differentiating said potential to provide pulses characteristic thereof, and means for analyzing said pulses to provide an output signal indicative of the character scanned.

4. In an analyzing device for reading characters and providing output signals identifying said characters, a scanning station comprising means for scanning characters advanced to said station to be read, means for providing output signals when said scanning means senses portions of a character at said station, means responsive to said output signals to provide a potential which varies with time from a reference potential to approximate the outline of said character with respect to a reference, means for differentiating said potential to provide pulses characteristic thereof, means for storing said pulses until scanning of the character is completed, and means for reading the information in said storage means for providing an output signal indicative of the character scanned.

5. In a device for reading characters and providing manifestations identifying said characters, a record having a plurality of characters thereon in predetermined relation, a scanning station comprising means for progressively scanning each character which is at said station, means for moving said record past said scanning station, means responsive to the position of a reference on said record for initiating the scanning of each character, means for providing output signals when said scanning means senses portions of said character, said output signals having a magnitude proportional to the distance between the portion sensed and a reference, circuit means responsive to said output signals to provide a potential for each character which is unique for that character, and means for analyzing said potential to provide a manifestation indicative of the character scanned.

6. In reading apparatus, a record having a plurality of characters thereon in predetermined relation, a scanning station comprising scanning means adapted to scan the characters on said record relatively continuously, means for moving said record past said scanning station, means responsive to the movement of said record for initiating the scanning of each character, means for providing output signals when said scanning means senses portions of said character, means responsive to said output signals to provide a potential which varies in magnitude as the portions of a character sensed vary from a reference datum, means for differentiating said potential curve to provide characteristic waveforms for each of said characters, and means for analyzing said waveforms to provide a manifestation indicative of the character scanned.

7. In a reading apparatus, means comprising scanning means adapted to scan characters to be read, horizontal and vertical sweep generators connected to supply sweep potentials to control said scanning means, means for providing output signals when said scanning means senses portions of a character, means responsive to said output signals for modifying one of said sweep potentials to cause said scanniing means to follow approximately the outline of a character being scanned, means for differentiating said one sweep potential to provide waveforms characteristic thereof, and means for analyzing said waveforms to provide a signal indicative of the character scanned.

8. In reading apparatus, means for scanning relatively continuously moving characters to be read in a prescribed pattern, horizontal and vertical sweep generators connected to supply sweep potentials to control said scanning means, means for providing output signals when said scanning means senses portions of said character, electronic tube means responsive to said output signals for modifying one of said sweep potentials, means for differentiating said one sweep potential to provide waveforms characteristic thereof, program control means responsive to the other of said sweep potentials for dividing said waveforms into a plurality of zones, storage means, said storage means storing information about said waveforms successively as they occur as determined by said program control means, and means for analyzing the information in said storage means to provide an output signal indicative of the character scanned.

9. In an analyzing device for reading characters and providing manifestations identifying said characters, a record having a character thereon, a scanning station comprising scanning means adapted to progressively scan the character on said record, horizontal and vertical sweep generators connected to supply sweep potentials to control said scanning means, means for moving said record past said scanning station, means responsive to the movement of said record for initiating the operation of said horizontal and vertical sweep generators, means for providing output signals when said scanning means senses portions of said character, means responsive to said output signals for modifying one of said sweep potentials to cause said scanning means to follow along the outline of said character, means for differentiating said one sweep potential to provide waveforms characteristic thereof, and means for analyzing said waveforms to provide a manifestation indicative of the character scanned.

10. In reading apparatus, a record having a character thereon, a scanning station comprising scanning means adapted to scan a character to be read, means for moving said record relatively continuously past said scanning station, means responsive to the movement of said record for initiating the scanning of said character, means for compensating said scanning means for record movement, means for providing output signals when said scanning means senses portions of said character, means responsive to said output signals to provide a potential which varies with time to approximate the outline of said character as said character is scanned, and means for analyzing said potential to provide a manifestation indicative of the character scanned.

11. In reading apparatus, a scanning station comprising scanning means adapted to scan characters presented to said station, horizontal and vertical sweep generators for controlling said scanning means, said sweep generators causing an electron beam to progressively scan a character at said station, means for producing output signals when said beam senses portions of said character, means responsive to said output signals for modifying the output potential of one of said sweep generators to reverse the direction of motion of said beam as long as a signal occurs, the output potential of said one sweep generator varying with time as said beam varies with respect to a reference datum, and means including a differentiating circuit for analyzing said output potential curve to provide a manifestation indicative of the character scanned.

12. In an analyzing device for reading characters and providing manifestations identifying said characters, a scanning station comprising scanning means adapted to progressively scan a character to be read, horizontal and vertical sweep generators connected to supply sweep potentials to control said scanning means, means for providing output signals when said scanning means senses portions of said character, circuit means connected to receive the output of one of said sweep generators and said output signals for providing a varying potential over a complete scanning operation, and means for analyzing said potential to provide a manifestation indicative of the character scanned.

13. In an analyzing device for reading characters and providing output signals identifying said characters, scanning means comprising means for progressively scanning a character to be read, horizontal and vertical sweep generators connected to supply sweep potentials to control said scanning means, means for providing output signals when said scanning means senses portions of said character, superimposer means responsive to the output of one of said sweep generators and said output signals for modifying said output signals so that the magnitude of each signal is dependent upon the time during a sweep when the portion producing the signal was sensed, means for integrating the output from said superimposer means, means for differentiating the output from said integrating means provide waveforms characteristic thereof, and means for analyzing said waveforms to provide a manifestation indicative of the character scanned.

14. In an analyzing device for reading characters and providing output signals identifying said characters, a station comprising scanning means for progressively scanning each character advanced to said station to be read, horizontal and vertical sweep generators connected to supply sweep potentials to control said scanning means, means for providing output signals when said scanning means senses portions of a character at said station, circuit means responsive to the output of one of said sweep generators and said output signals for modifying said output signals to provide a potential which varies with time from a reference potential to approximate the outline of the character scanned, means for differentiating said potential curve to provide waveforms characteristic thereof, multi-stage storage means, programming means controlled by the other of said sweep generators for determining the entry of successive portions of said waveforms to said individual stages of said storage means, and means for reading the information in said storage means for providing an output signal indicative of the character scanned.

15. In reading apparatus, means to scan relatively continuously moving characters to be read, the scanning means comprising means for progressively scanning each character to be read during movement of the character in a plurality of sweeps which travel substantially normal with respect to the direction in which the character stands, means for producing output signals when the scanning means senses a portion of the character, the magnitudes of said signals varying as a function of the time during a sweep when the portion producing the signal is sensed, integrating means connected to receive said signals for producing an envelope potential which follows the peaks of the signals, a differentiating circuit connected to receive said envelope potential for producing output pulses which occur at points of discontinuity in the envelope potential, and analyzing means responsive to said output pulses and the time during a scanning cycle when they occur for providing a manifestation indicative of the character scanned.

16. In reading apparatus, a record card having a plurality of characters to be read in spaced relation thereon, light responsive means for producing an output potential which varies in accordance with the amount of light received thereby, a light source, means for feeding said record card between said light responsive means and said light source for varying the amount of light received by said light responsive means, means for scanning the characters which are on said record under the direction of control means which is responsive to the output potential of said light responsive means, said control means initiating the scanning of a character at predetermined values of said output potential, means for providing output signals when said scanning means senses portions of said character, and circuit means responsive to said output signals for providing a manifestation indicative of the character scanned.

17. In reading apparatus, a record card having a plurality of characters to be read in spaced relation thereon, light responsive means for producing an output potential which varies in accordance with the amount of light received thereby, a light source, means for feeding said record card between said light responsive means and said light source for varying the amount of light received by said light responsive means, and means for scanning the characters which are on said record under the direction of control means which is responsive to the output potential of said light responsive means, said control means initiating the scanning of a character at predetermined values of said output potential.

18. In reading apparatus, a record having a character thereon which is to be read, a scanning station to which the character on said record is presented, said scanning station comprising sweep generating means for guiding a scanning beam in a prescribed pattern at said station, programming means controlled by the position of said record for initiating the operation of said sweep generating means, means responsive to the sensing of portions of said character for providing output signals, superimposer means controlled by said sweep generating means and said programming means connected to receive said output signals and change the magnitudes thereof so that the magnitude of each signal from said superimposer means is a function of the time during a sweep when the signal being modified was produced, an integrating circuit connected to receive the output signals from said superimposer means for producing an envelope potential, circuit means connected to differentiate said envelope potential, a multi-stage storage device, distributor means under the control of said programming means for directing different parts of the thus differentiated envelope potential into different stages of said storage device, and logical circuitry means controlled by said storage device for determining the identity of the character scanned and providing an output signal indicative thereof.

References Cited in the file of this patent

UNITED STATES PATENTS

| | | |
|---|---|---|
| 1,579,263 | Watson | Apr. 6, 1926 |
| 1,851,072 | Vernam | Mar. 29, 1932 |
| 2,040,813 | Ogloblinsky | May 12, 1936 |
| 2,398,988 | Ziebolz | Apr. 23, 1946 |
| 2,415,059 | Zworykin | Jan. 28, 1947 |
| 2,472,774 | Mayle | June 7, 1949 |
| 2,533,242 | Gridley | Dec. 12, 1950 |
| 2,538,065 | Wallace | Jan. 16, 1951 |
| 2,604,534 | Graham | July 22, 1952 |
| 2,645,712 | Rajchman | July 14, 1953 |